Figure 1:
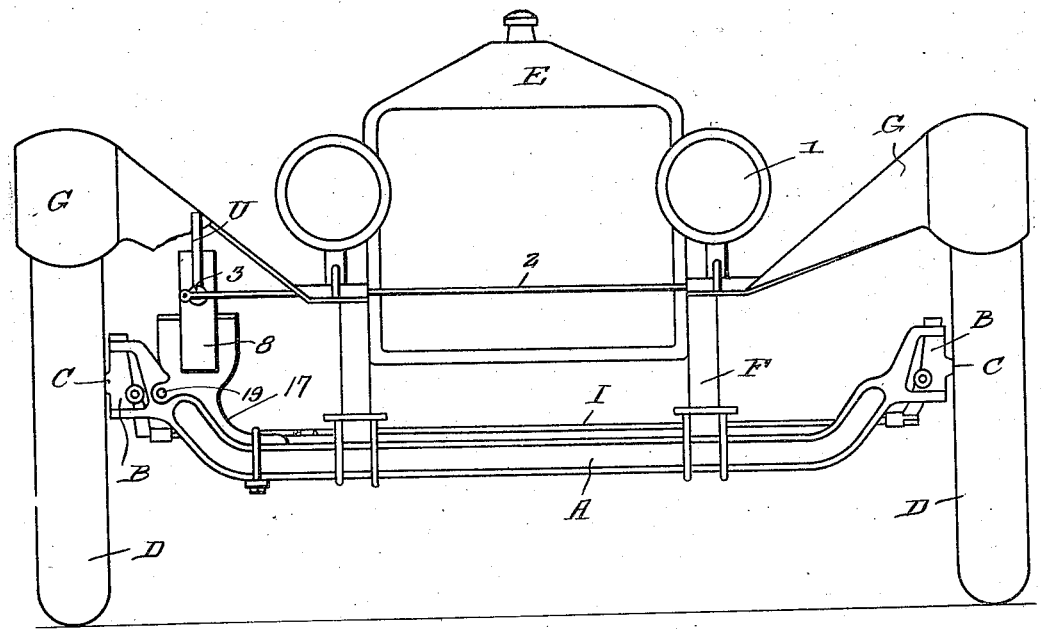

Oct. 4, 1927.

J. GLENNON 1,644,427

DIRIGIBLE HEADLIGHT

Filed Oct. 20, 1926

2 Sheets-Sheet 1

Inventor
James Glennon,

By Clarence A. O'Brien
Attorney

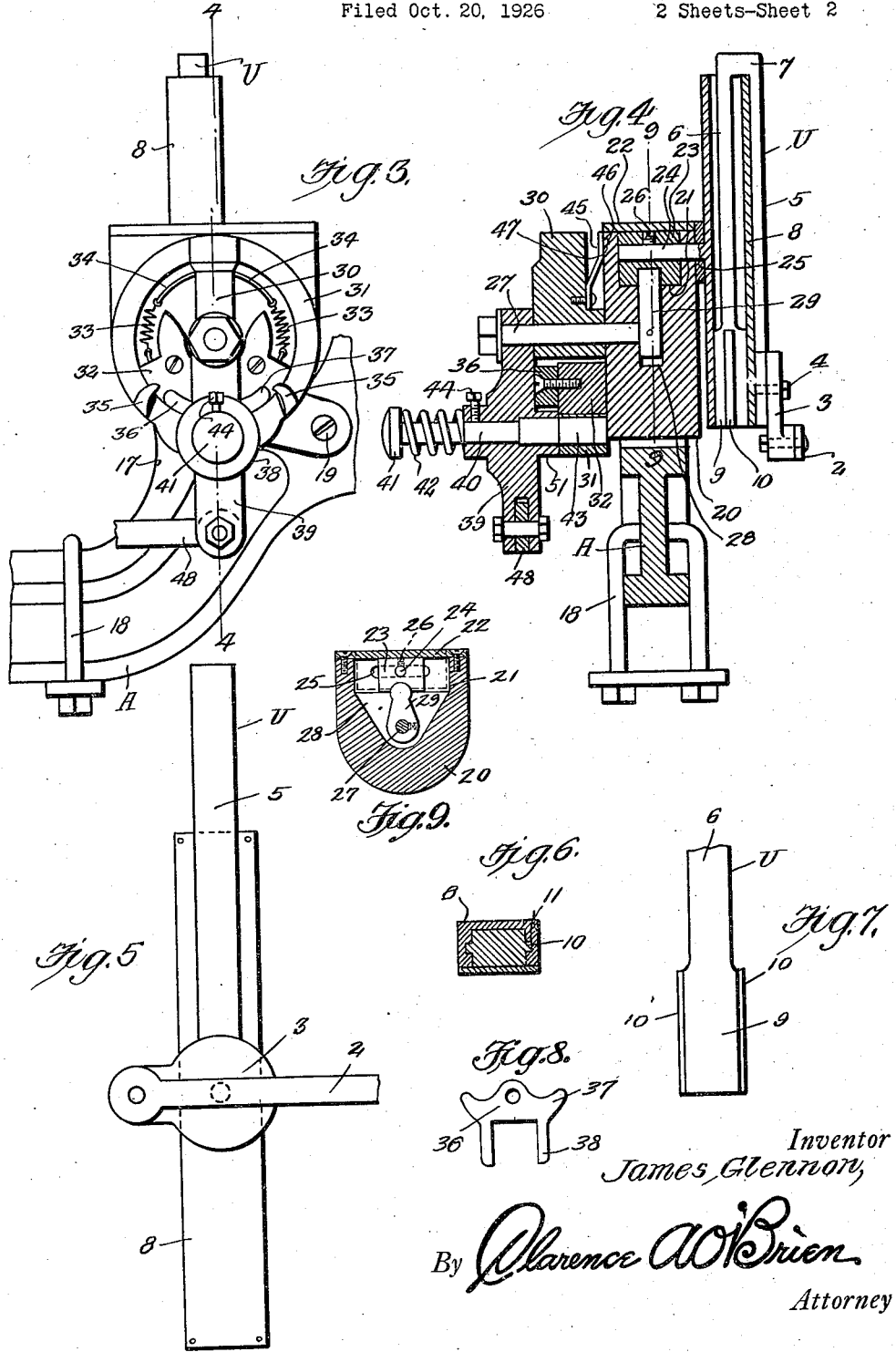

Patented Oct. 4, 1927.

1,644,427

UNITED STATES PATENT OFFICE.

JAMES GLENNON, OF ROCHESTER, MINNESOTA.

DIRIGIBLE HEADLIGHT.

Application filed October 20, 1926. Serial No. 142,966.

The present invention relates to a dirigible headlight and is designed more particularly as an improvement upon the structure shown in Patent No. 1,515,105.

The general object of the invention is to provide simple and efficient means for transmitting motion to the headlights when the front wheels of the vehicle are turned whereby the headlights are swung to the right or to the left for the purpose of illuminating the path into which the machine is turning.

An important object of the invention is to provide means in a dirigible headlight operating mechanism for compensating between the relative movement of the chassis in relation to the axles.

With the above and other objects in view as will appear as the description proceeds, the invention resides in the combination and arrangement of parts and in the details of construction herein described and claimed.

Figure 2:
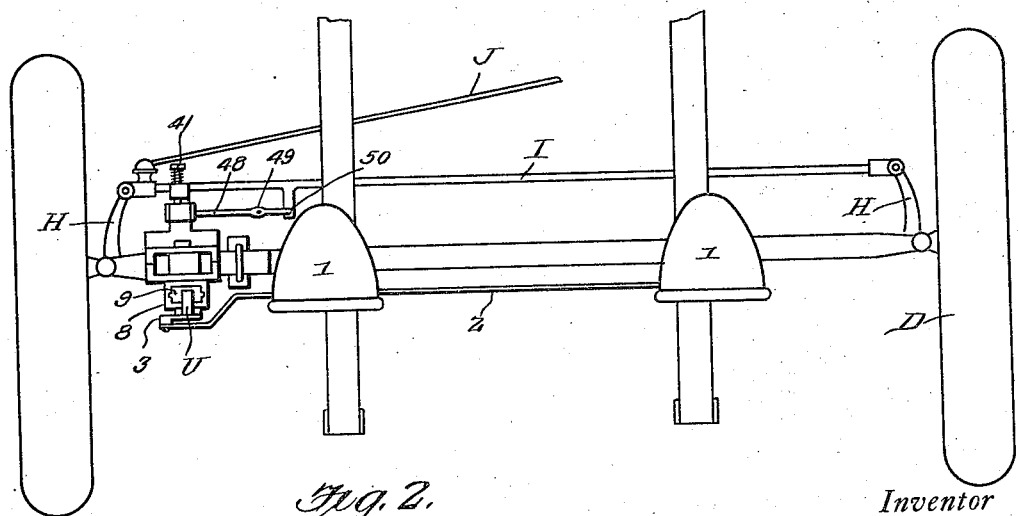

In the drawing:

Figure 1 is a front elevation of the dirigible headlights applied to an automobile the distant portions of the automobile being removed, Fig. 2 is a plan view of the dirigible headlight mechanism, Fig. 3 is an enlarged rear elevation of a portion of the mechanism of the apparatus, Fig. 4 is a section on the line 4—4 of Fig. 3, Fig. 5 is a side elevation of the parts particularly forming my improvement, Fig. 6 is a transverse section therethrough, Fig. 7 is a detail elevation of the lower end of one part thereof Figure 8 is a detail view of the tripping lever, Figure 9 is a sectional view taken on the line 9—9 of Figure 4.

Referring to the drawing by characters of reference, it will be seen that A denotes the front axle of an automobile having the usual knuckles B, the spindles C of which are supported on the front wheels D. A portion of the vehicle body has been shown at E and is mounted on springs after the usual way. The front mud guards have been indicated at G. Extending rearwardly from the knuckles B carrying the spindles C are arms H connected by a cross rod I and another rod J connects this rod to the steering shaft, not shown. The mechanism thus far described is the same as that found on most automobiles and does not, in itself, constitute any part of the present invention. Headlights are denoted by the numerals 1 and are operatively connected in any suitable manner with connecting rod 2 so that the reciprocation of this rod back and forth across the front of the automobile will revolve the headlights in a manner that is well known in this art. My previous patent heretofore referred to shows the preferred embodiment for making this operative connection. The rod 2 is pivotally connected to the end of a crank 3 which is rockably mounted as at 4 on an inverted U-shaped member U which includes legs 5 and 6 connected by bight 7. A tubular casing 8 receives the leg 6 and the leg 5 is disposed exteriorly thereof. The end of the leg 6 terminates in a head 9 having tenons 10 on opposite sides thereof for sliding in mortices 11 formed in the sides of the tubular casing 8. The casing 8 is supported on a laterally extending pin 24 located intermediate its ends.

Secured to one portion of the axle is a bracket 17 adapted to be held in place by a U-bolt 18 and a threaded bolt 19 engaging the axle. Obviously, however, any other fastening means can be used. This bracket has an integral body 20, the bottom portion of which is grooved along a line extending parallel with the longitudinal axis of the axle A, the groove being shown particularly at 21 in Fig. 4. A cover plate 22 serves to conceal the groove and is detachably secured on the body. Slidably mounted within this groove is a block 23 from which extends the pin 24 slidable within the slot 25 in one side wall of the groove 21. This pin is integral with or fixedly secured to the back of the tubular casing 8 as previously indicated and is held against rotation within the block 23 by set screw 26 or the like.

A shaft 27 is journaled within the body 20 and extends rearwardly therefrom, there being a recess 28 in the body and opening upwardly into groove 21. A crank arm 29 is secured to the shaft 27 and is mounted within the recess 28, the upper end of this arm being in engagement with the block 23 so that when the shaft is rotated back and forth the arm will produce a back and forth sliding movement of block 23 and a corresponding sliding movement of the headlights 1 so that they may be turned to the right or the left. Secured to the shaft 27 so as to rotate therewith is an arm 30 radially disposed within and formed integral with or secured to the ring 31 concentric with the shaft. This ring will rotate with the shaft. Projecting into the ring from the back face of the body 20 is a segment 32 to the opposite end portions of which are connected springs 33. An elevated arcuate loop 34 is extended from each side of the arm 30, these loops being located within the space surrounded by the ring 31 and being attached to the respective springs 33. Thus it will be seen that the springs and loops cooperate to hold the arm 30 in a substantially vertical position at which time the crank arm 29 is in its intermediate position with the block 23 centrally disposed as shown. Projecting from the ring 31 adjacent the lower portion thereof are spaced lugs 35 and pivotally mounted on the segment 32 so as to be supported between these lugs is a tripping lever 36 having oppositely extending fingers 37 and a downwardly extending fork 38.

Loosely mounted on the shaft 27 to rotate freely thereon is an arm 39 on which is slidably mounted a plunger 40 having a head 41 at its outer end. A spring 42 bears against this arm and against the head 41 so as to hold the plunger normally retracted through an opening 43 formed in the ring 31 midway between the lugs 35. Any suitable means, such as the set screw 44, can be used for holding the plunger 40 projected into the opening 43 with the spring 42 under compression. A leaf spring 45 is carried by the ring 31 and has a knob or projection 46 adapted to be seated in the recess 47 in the body 20, thereby to hold the ring against accidental movement.

A link 48 is connected to the lower end of the arm 39 and is pivotally attached as at 49 to an angular arm 50 extending from the rod I.

It is to be understood that under ordinary conditions, the plunger 40 is disengaged from the ring 31 as shown in Fig. 4. Thus, when the steering mechanism of the vehicle is operated the arm 39 actuated thereby will swing freely on the shaft 27 without changing the positions of the lamp housing. At this time the spring 45 holds the ring 31 and the parts operatively connected thereto against accidental movement. The slidable connection provided by the casing 8 and member U will allow the body of the vehicle to move upwardly and downwardly upon its springs and relative to the axle A without breaking the connection between the lamp housings and their operating means.

When it is desired to couple the lamp housing and the steering mechanism, the plunger 40 is forced into the opening 43 and fastened by any suitable means such as the set screw 44. Thus when the steering mechanism is operated, motion will be transmitted from the rod I and arm 50 through link 48 to arm 39. When the arm is swung to the right a corresponding rotation of ring 31 will be set up and the lever 36 will be tilted by a boss 51 formed on the arm 39 and projecting into fork 38. The plunger 40 is slidable in the boss 51 as shown in Figure 4. When the lever 36 is thus tilted, it moves to a position where one finger 37 will not obstruct the movement of the adjacent lug 35.

The opening 43 of ring 31 is elongated so that its length is greater than the diameter of the plunger 40. This is done so that while a vehicle is being driven along a straight road, it will be possible for the front wheel to be turned slightly to the right or to the left without turning the headlights. In other words, the elongated opening provides a small amount of lost motion to the connection between the steering mechanism and the headlights. Lost motion is undesirable, however, when a vehicle is being straightened out in a road after making a turn. Under such conditions it is necessary for the safety of the driver that the headlights be promptly thrown into the direction into which the vehicle is travelling. For this purpose, the lever 36 and the lugs 35 have been provided. When the steering mechanism begins to turn back after the vehicle has made a turn, the plunger 40 will move longitudinally of the opening 43 and ordinarily would not actuate the lamp mechanism. With the structure described, however, as soon as the arm 39 begins its return swinging movement, the boss 51 will actuate the fork 38 and cause the depressed arm or finger 37 of the lever to flick upwardly against the lug 35 in the path thereof with the result that said lug will be shifted by the lever and cause ring 31 to rotate. Consequently, the lamps will be restored promptly to their normal position, this movement being accelerated by the springs 33. When the lamps are brought to normal position, the knob 46 will snap into the recess 47 and hold the parts together against accidental displacement. Obviously, when the vehicle is turned in the opposite direction, the operation hereinbefore described will be repeated.

It is thought that the construction, operation, and advantages of this invention will now be clearly understood by those skilled in this art without a more detailed description thereof. The present embodiment of the invention has been disclosed in detail merely by way of example since in actual practice it attains the features of advantage enumerated as desirable in the statement of the invention and the above description. It is apparent that changes in the details of construction and in the combination and arrangement of parts may be resorted to without departing from the spirit and the scope of the invention hereinafter claimed or sacrificing any of its advantages.

Having thus described my invention what I claim as new is:

1. A dirigible headlight operating mechanism for automobiles, comprising a body to be mounted on the front axle on the automobile, and provided with a groove, a block slidably mounted in the groove, means controlled by the steering apparatus of the automobile for sliding the block in the groove, a pin extending into the block, a tubular casing carried by the pin, an inverted U-shaped member having one leg slidably mounted in the tubular casing, a crank on the other leg of the inverted U-shaped member, and a headlight shifting rod engaged with the crank.

2. A dirigible headlight operating mechanism for automobiles, comprising a body to be mounted on the front axle on the automobile, and provided with a groove, a block slidably mounted in the groove, means controlled by the steering apparatus of the automobile for sliding the block in the groove, a pin extending into the block, a tubular casing carried by the pin, an inverted U-shaped member having one leg slidably mounted in the tubular casing, a crank on the other leg of the inverted U-shaped member, and a headlight shifting rod engaged with the crank, the leg of the inverted U-shaped rod which is slidable in the tubular casing is provided with a head having tenons on opposite sides thereof slidable in mortices formed in the casing.

In testimony whereof I affix my signature.

JAMES GLENNON.